United States Patent [19]
Malcolm

[11] 3,929,219
[45] Dec. 30, 1975

[54] RECIPROCATING VARIABLE SPEED MATERIAL TRANSFER CONVEYOR SYSTEM

[75] Inventor: Donald B. Malcolm, Pittsburgh, Pa.

[73] Assignee: Dravo Corporation, Pittsburgh, Pa.

[22] Filed: Mar. 27, 1974

[21] Appl. No.: 455,415

[52] U.S. Cl. ............... 198/111; 198/31 AB; 198/60; 198/76; 198/89; 271/200
[51] Int. Cl.² .................................. B65G 21/12
[58] Field of Search ............ 198/31 AB, 60, 76, 89, 198/101, 126, 111; 271/84, 200

[56] References Cited
UNITED STATES PATENTS
| | | | |
|---|---|---|---|
| 3,149,734 | 9/1964 | Ilmoni | 198/76 X |
| 3,184,037 | 5/1965 | Graves et al. | 198/52 X |

Primary Examiner—Richard A. Schacher
Assistant Examiner—Douglas D. Watts
Attorney, Agent, or Firm—Parmelee, Miller, Welsh & Kratz

[57] ABSTRACT

The depth and pattern of material deposited across the width of a receiving conveyor from a shuttle conveyor, the discharge end of which moves transversely across the receiving conveyor, while the shuttle conveyor is supplied with material from a fixed substantially constant supply is accomplished by mounting the shuttle conveyor on a carriage to effect its reciprocation while the shuttle conveyor is driven at a constant speed forward relative to the ground and fixed source of supply, but at a variable speed relative to the carriage depending on whether the carriage is moving toward or away from the receiving conveyor. This is effected by differentially controlling the speed of the shuttle conveyor relative to the carriage according to the speed and direction of movement of the carriage.

15 Claims, 10 Drawing Figures

RECIPROCATING VARIABLE SPEED MATERIAL TRANSFER CONVEYOR SYSTEM

This invention relates generally to material conveyor systems in which a shuttle conveyor transfers material received thereon at a substantially, but adjustable, fixed rate, to a wider receiving conveyor means of some type across which the discharge end of the shuttle conveyor travels from side to side in such manner as to deposit the material in a controlled pattern on the receiving conveyor.

For purposes of illustration, but without limitation thereto, this invention will be herein described in connection with the transfer of formed pellets of ore or other material onto a receiving conveyor, such as a traveling grate, or chain grate, wire belt dryer or a simple wide belt conveyor where it is desirable to discharge the material to a uniform depth or some controlled pattern on the receiving conveyor. This is accomplished by discharging the pellets from the end of a transfer or shuttle conveyor that moves crosswise of the receiving conveyor, and which receives the pellets at one or more fixed points relative to its back and forth travel.

More specifically, in the case of pellets, the green pellets are discharged from a pelletizing disk or drum at a substantially uniform constant rate and often pellets may be generated on two or three disks or drums at the same time. These are delivered to a transfer or shuttle conveyor that reciprocates back and forth across a receiving conveyor while discharging material from one end onto the receiving conveyor. The receiving conveyor may be a traveling grate or the like which usually is a few meters, perhaps 2, 3 or 4, in width.

If the shuttle conveyor were a unit mounted on a carriage in the manner of a conventional shuttle conveyor, the material would be more sparsely loaded onto the belt of the shuttle conveyor from the pelletizing apparatus or other loading means when the shuttle was traveling in one direction, i.e., toward the far side of the receiving conveyor, than when it was retreating from the far side so that the rate of discharge of the material onto the receiving conveyor would correspondingly alternately be leaner and heavier. Of equal significance is the fact that the green pellets would be unevenly loaded onto the belt because of its back and forth travel past the fixed loading point or points.

To avoid such uneven distribution of the pellets on the receiving conveyor, or uneven loading of the shuttle conveyor, it is necessary that the belt of the shuttle conveyor always travel past the loading point at a constant speed. That is, its speed relative to the ground, shall be constant notwithstanding the direction and speed of travel of the discharge end of the conveyor over the receiving conveyor or past the loading point. Stated another way, no matter whether the discharge end of the shuttle conveyor is advancing or retreating, the speed of the shuttle conveyor relative to a fixed point on the ground will be the same.

One system designed to accomplish the desired purpose of the present invention is disclosed in U.S. Patent to Greaves, et al., No. 3,184,037, dated May 13, 1965. I regard this to be one of the most satisfactory means heretofore developed for the purpose. It employs a shuttle belt that has a movable carriage with the return run of the conveyor belt reeved over fixed and movable pulleys in such manner as to maintain the speed of the load-carrying run of the belt substantially constant relative to the ground by lengthening or decreasing the length of the belt with the advance or retreat of the discharge end of the belt relative to the wide receiving conveyor.

Such a system as there disclosed is expensive and complicated.

BRIEF SUMMARY OF THE PRESENT INVENTION

According to the present invention there is a shuttle or transfer conveyor belt of fixed length of usual construction with a roll at each end around which the belt passes to provide an upper load-carrying run and a lower return run, and one of said rollers may be the drive pulley for the belt. This belt conveyor receives pellets or other material to be transferred at one or more fixed loading points. The conveyor is mounted on a carriage structure which is wheeled for back and forth movement in the direction of the length of the conveyor, and mechanism is provided for effecting the reciprocation thereof. The discharge end of the belt extends over a wide receiving conveyor which may, for example, comprise a traveling grate, an endless screen conveyor comprising part of the dryer, or another endless belt, or the like, so that when the carriage is reciprocated the discharge end of the shuttle conveyor moves crosswise of the receiving conveyor advancing toward the remote edge and then retreating toward the near edge.

With this invention the shuttle conveyor belt driving roller or pulley is driven through means in which a motor drive for the belt retards the speed of the belt relative to the carriage as the carriage advances and accelerates it as the carriage retreats in such manner that the belt speed relative to the ground or fixed loading point is constant while its speed relative to the carriage is varied according to the speed and direction of travel of the carriage. For example if there is a drive motor for the shuttle conveyor belt that drives the belt through one side of a differential gear and the other side of the differential gear is driven by means actuated by the back and forth travel of the carriage, the belt speed relative to the carriage will be the sum of or the difference between the two speeds. Specifically, if the carriage is advancing over the receiving conveyor in the same direction that the load on the shuttle conveyor is moving, the differential will reduce the speed of the shuttle conveyor belt relative to the carriage sufficient for example that the speed of the shuttle conveyor belt is substantially the same as if the carriage were not advancing. If the carriage is retreating, then the differential increases the speed of the shuttle conveyor belt relative to the carriage to such extent that the speed of said conveyor relative to the ground and to the fixed load-receiving point, is agaain the same as if the carriage were not moving.

By so varying the speed of the belt relative to the carriage but constant with respect to the ground, the material may be deposited on the receiving conveyor in selected controlled patterns.

My invention may be more fully understood by reference to the accompanying drawings wherein.

Figure 19:
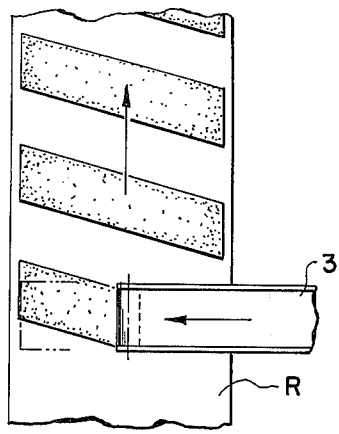
Figure 20:
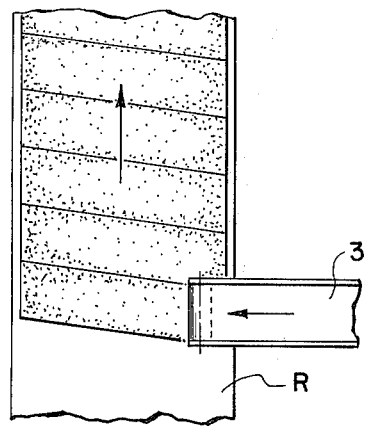
Figure 21:
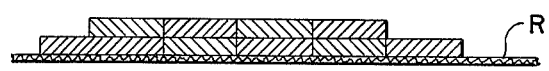

FIG. 19 discloses a pattern of placing the material on the receiving conveyor in spaced parallel diagonal rows;

FIG. 20 shows a similar pattern except that there are no spaces between adjacent rows; and FIG. 21 is a diagrammatic section longitudinally of the receiving conveyor illustrating a load of generally uniform depth formed by overlapping successive passes of the shuttle conveyor.

Figure 1:
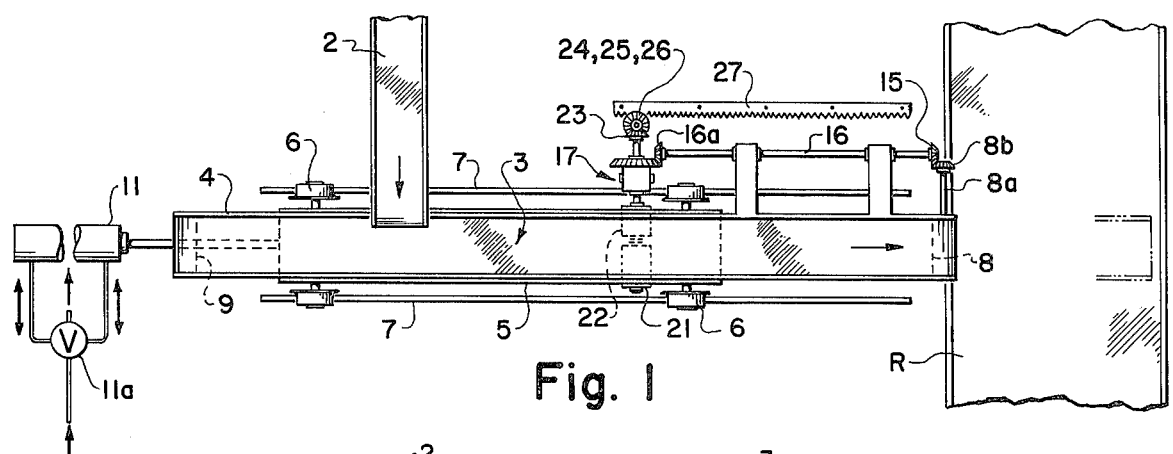
FIG. 1 is a schematic plan view illustrating an apparatus such as that with which the present invention is concerned, but showing all of the parts schematically related.
Figure 2:
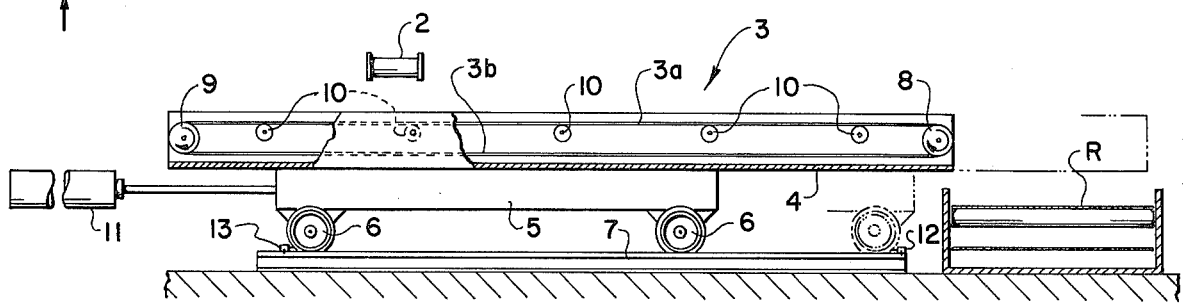
FIG. 2 is a schematic side elevation of the carriage and conveyor shown in FIG. 1.

Referring first to FIGS. 1 and 2, the numeral 2 designates a loading conveyor which discharges green pellets or other material at a generally uniform rate at one, or by duplication, at more than one fixed locations onto a shuttle or transfer conveyor belt, designated generally as 3. This transfer conveyor belt is supported in a frame 4 that is fixed onto a reciprocable carriage 5. The carriage 5 may have wheels 6, guided on a track 7. The conveyor belt 3 has an upper load-receiving and carrying run 3a and a lower return run 3b. It passes around a roller or pulley 8 normally fixed at the forward or discharge end of the shuttle conveyor and a normally fixed roller 9 at its opposite end (although it may be adjustable to tension the belt in accordance with usual practice). There may be supporting rollers under the upper run as indicated at 10 in FIG. 2.

The carriage 5 reciprocates the discharge end of the shuttle conveyor 3 crosswise of a wide receiving conveyor R or the like which travels in the direction of the arrow in FIG. 1, and which, as above stated, may be an endless traveling grate, a chain grate, wire screen belt or the like, so that the discharge end of the shuttle conveyor normally always projects over the receiving conveyor and may move from the full line position in FIG. 1 to the dotted line position near the far edge of the receiving conveyor, and then back, or as here shown, from left to right and then back from right to left. Movement of the carriage toward the far edge will herein sometimes be referred to as "advancing" and in the reverse direction as "retreating".

For simplicity of illustration, there is shown a hydraulic cylinder and piston arrangement 11 for reciprocating the carriage. There is the usual hydraulic circuit for such a unit including a reversing valve 11a. Limit switches 12 and 13 along the track 7 control the operation of this valve in a well known manner and the stroke may be shortened by adjusting both switches along the track 7 toward each other if it is desirable to lay a swath of material on the receiving conveyor of less length than the maximum from adjacent one edge to a location adjacent the other edge.

For purposes of illustration I have shown the forward roller 8 as the drive pulley for the belt conveyor. It is shown in FIG. 1 with a drive shaft 8a at one end having a bevel gear 8b fixed thereto. This gear meshes with a drive pinion 15 on a longitudinally-extending shaft 16 carried on the conveyor belt frame.

Figure 16:
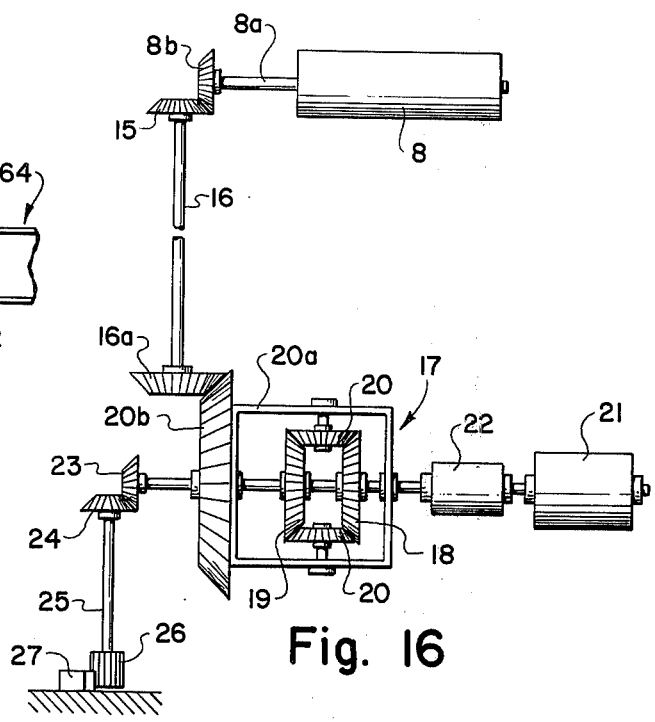
FIG. 16 is a schematic view of a mechanical form of differential drive for the shuttle conveyor belt.

A differential gear is indicated at 17 having opposed bevel gears 18 and 19 between which are differential gear wheels 20 carried inside a box or cage 20a. This box has a bevel gear 20b that meshes with gear wheel 16a on shaft 16. Referring to FIG. 1 and FIG. 16, the gear wheel 18 is driven from a motor 21 and speed reducer 22. The gear wheel 19 is driven from a gear wheel 23 meshing with a pinion 24 at the top of a vertical shaft 25. This shaft has a pinion 26 at its lower end that meshes with a fixed rack 27 extending parallel with the track 7. The box 20a and gear wheel 20b are of course free to rotate independently of the drive shafts for the gear wheels 18 and 19, as in any conventional differential gear system.

It will be understood that the drawings as herein described are for purposes of illustration and that when embodied in an actual machine the various parts and mechanisms would be much more compactly and precisely arranged. However constructed, the speed of the belt 3 relative to the carriage will be effected through the differential gearing according to the speed and direction of the carriage along the track, that is over the ground, and by the speed of the drive motor and speed reducer.

Figure 3:
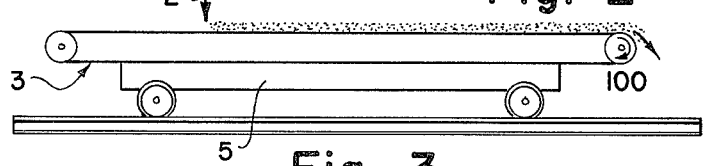
FIG. 3 is a diagrammatic view of the shuttle conveyor indicating the conveyor speed relative to the carriage with the carriage stationary.
Figure 4:
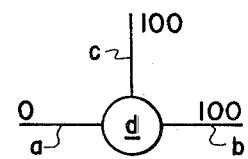
FIG. 4 is an illustrative diagram explanatory of FIG. 3.

This will be more clearly seen by reference to FIGS. 3 through 10. In FIG. 3 the carriage is assumed to be stationary and the shuttle conveyor belt-driving motor and speed reducer are operating to drive the belt at 100 units per minute. Since at this time differential gear wheel 19 is stationary, gear wheel 18 alone will drive the belt at the set speed of 100 units toward the right. In the diagram, FIG. 4, the line a indicative of carriage travel, is at 0, the motor drive, indicated by line b is rotating in the direction of the arrow, and the pulley, designated by line c is at +100 units through the differential. The circle d indicates the differential.

Figure 5:
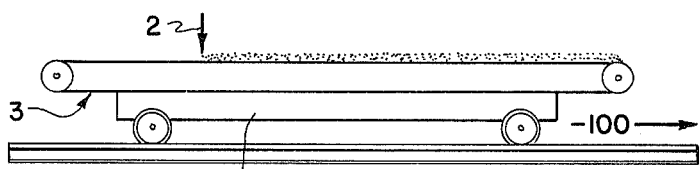
FIG. 5 is a view similar to FIG. 3 but indicating the conveyor speed relative to the carriage with the carriage advancing.
Figure 6:
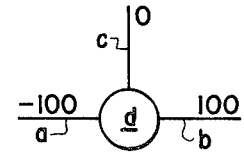
FIG. 6 is an illustrative diagram explanatory of FIG. 5.

Referring now to FIGS. 5 and 6, where the carriage is assumed to be moving toward the right — advancing — at 100 units per minute, line a is rotating 100 units in one direction and line b 100 units in the opposite direction, with the result that line c, representing pulley and belt speed, is not rotated. The belt 3 therefore is stationary relatively to the carriage, but its speed relative to the ground, and therefore relative to the loading point 2, is 100 units toward the right. With the shuttle belt 3 stationary relative to the carriage, no material would be discharged from the front end of the shuttle conveyor belt.

Figure 7:
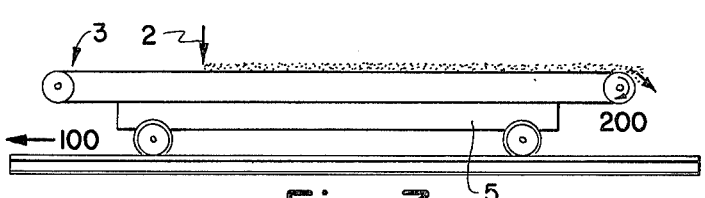
FIG. 7 is a view similar to FIG. 1 but indicating that the carriage is retreating.
Figure 8:
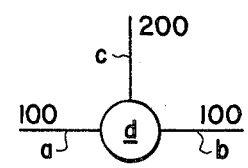
FIG. 8 is a diagram explanatory of FIG. 7.
Figure 9:
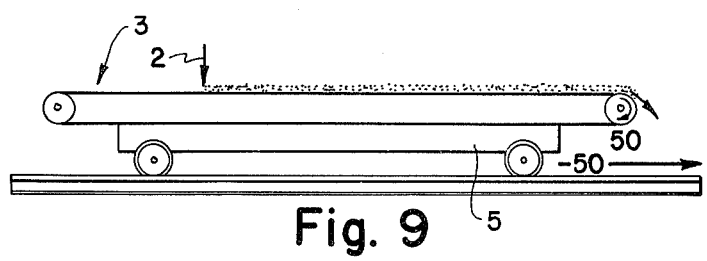
FIG. 9 is a view similar to FIG. 7 but with the carriage retreating at a slower speed than the belt speed relative to the ground.
Figure 10:
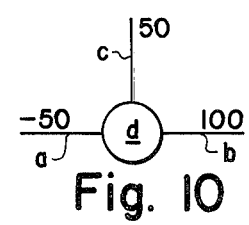
FIG. 10 is a diagram explanatory of FIG. 9.

If, however, the carriage is retreating, that is moving toward the left at 100 units per minute, as diagrammed in FIGS. 7 and 8, and the motor speed 21 is unchanged, that is, set to drive the top run of belt 3 at 100 units as if the carriage were stationary, the two drives then combine at the differential so that the top run of belt 3 is driven at a speed relative to the carriage of 200 units, but relative to the ground, that is, the loading and unloading stations, its speed is still 100 units toward the right.

For simplicity of explanation, although not perhaps a typical example, assume the carriage to be moving to the right at 50 units per minute and the motor is operating at the same speed as in FIGS. 5 to 8, the pulley and top run of belt 3 will be rotated relative to the carriage at a speed which is the sum of the two speeds, i.e., +100 and −50, or +50 units per minute but the speed of the belt past loading point 2 and relative to the receiving conveyor R, that is, its speed relative to the ground, is 50 units to the right, imparted by the carriage and 50 units to the right by belt speed, or 100 units relative to the ground.

It will thus be apparent that the differential operates to reduce the speed of the belt relative to the carriage when the carriage is advancing by an amount sufficient to maintain the travel of the top or load-carrying run of the conveyor 3 constant relative to the ground. The forward speed of the carriage is subtracted from the speed which the belt-driving motor alone would produce. When the shuttle conveyor is retracting, the two components of travel are added. Stated another way, the speed of the top run of the conveyor belt 3 relative to the carriage is always the sum of the speed of the carriage, which may be a plus or minus quantity and a constant pre-selected motor speed. Generally the motor speed should always be a plus quantity. Should the carriage ever advance at a speed greater than the belt speed, the direction of travel of the belt relative to the carriage would reverse even though its speed relative to the ground would remain constant. This would produce a gap in the unloading of the shuttle conveyor when the top reach of the belt again traveled forward relative to the carriage. However the carriage may retreat, i.e., move toward the left as viewed in the diagram FIGS. 3 to 10 faster than the absolute value of the belt speed relative to the ground, and this condition may often be desirable.

While I have here referred to and described the transfer or shuttle conveyor as a belt conveyor, and a belt conveyor would normally be used for green pellets and most other materials, the same differential drive could be used with a screw conveyor.

From the foregoing it can be seen that the rate of advance and the rate of retreat of the shuttle conveyor carriage may be altered in various way to change the pattern of the material deposited on the receiving conveyor R. For example the reversing valve 12 may provide passages more restricted to the flow of liquid therethrough in one direction of travel of the carriage than when the valve is reversed. If the receiving conveyor R were stationary the discharge end of the conveyor 3 would simply follow a straight back and forth pattern. If the receiving conveyor R were moved in increments after each pass of the discharge end of the shuttle conveyor across it, parallel bands of material could be laid down crosswise on the belt. However, since the belt R is usually moving continuously in the direction of the arrow, the back and forth movement of the discharge end of the shuttle conveyor 3 will describe a zig-zag pattern over the surface of conveyor R, provided the shuttle conveyor would retreat at the same speed at which it advanced.

By operating the shuttle in the manner disclosed in FIGS. 5 and 6 on the forward stroke and in the manner disclosed in FIGS. 7 and 8 on the return stroke, one may deposit parallel diagonal rows of material on the receiving conveyor R as shown in FIG. 19 because no pellets will be discharged on the forward travel of the carriage but they will be discharged on the retreating travel, resulting in a diagonal gap between adjacent rows of material so placed on the receiving conveyor if the speed of the carriage in each direction is the same. If, however, the speed of the receiving conveyor R relative to the width of the shuttle conveyor is such that the forward travel of the receiving conveyor is slightly less than the shuttle conveyor width, that is to say if the diagonal band which the shuttle lays down on the belt R as the shuttle and carriage retreat, and the advance stroke of the carriage and shuttle conveyor is so fast that the next retreat will begin just as the receiving conveyor will have traveled a distance equal to the width of the shuttle belt (or the cross band of material which it laid down on the previous retreating path) then the side-by-side pattern of FIG. 20 will result. In other words, by having the width of the shuttle conveyor and the speed of travel of the receiving conveyor such that one complete cycle of retreat and advance can be completed before the receiving conveyor has moved more than the width of the band of material deposited on the receiving conveyor in a single retreating pass of the shuttle conveyor. In such case the upper forward corner of shuttle conveyor 3 as viewed in FIG. 3 will move across to the lowermost opposite corner of the swath of material last placed on the conveyor. Also, depending on the speed of the receiving conveyor R, its width and speed of operation and width of the shuttle conveyor, a pattern approaching FIG. 21 may be produced. For example, referring to FIGS. 20 and 21, the speed of the receiving conveyor R may be such that each subsequent pass after the first overlaps the preceding one by a half width, and with the shuttle conveyor discharging material to no significant extent on the retreating pass, the solid covering of the surface R to practically uniform depth can be achieved. The reversed cross-hatching in FIG. 21 illustrates alternate discharge passes, those areas in which the cross-hatching slopes toward the left constitute 1, 3 and 5 passes, and those cross-hatched to the right are alternate even number passes, all passes after the first partially overlapping a preceding swath. With a fairly even distribution of material in swaths across the conveyor R, irregularities lengthwise of the belt may be leveled out by the use of a roller conveyor of a type known in the art between conveyor R and a traveling grate, for example. In that case the conveyor R is not itself a grate but an apparatus interposed between a shuttle feeder and the ultimate grate structure on which the pellets or other material is to be processed.

In some cases the shuttle belt 3 may be of substantial length. In such event it may be desirable to form the carriage of two spaced units connected mechanically, electrically or hydraulically to function as a unit, as hereinafter described.

Figure 11:
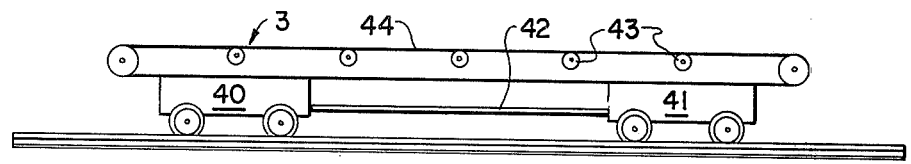
FIG. 11 is a schematic view similar to FIG. 2 but showing an articulated carriage having two parts connected by a rigid link.

In FIG. 11 the carriage has two spaced sections 40 and 41. A rigid link 42 connects them. Between the two carriage sections there may be load-supporting rollers 43 under the upper run of the conveyor belt 44, or even both runs can be so supported. These support rollers are fixed relative to the carriage sections and they are clear of the maximum travel of the carriage sections 40–41. Reciprocation of the carriage may be provided by some operating means as disclosed in FIG. 1 or otherwise. This arrangement substantially reduces mass or weight of the movable elements of the assembly and hence its inertia. The conveyor belt is designated 7 in FIG. 11, and the forward terminal roller is 8 and the rear one 9. The belt drive is omitted for clarity.

Figure 12:
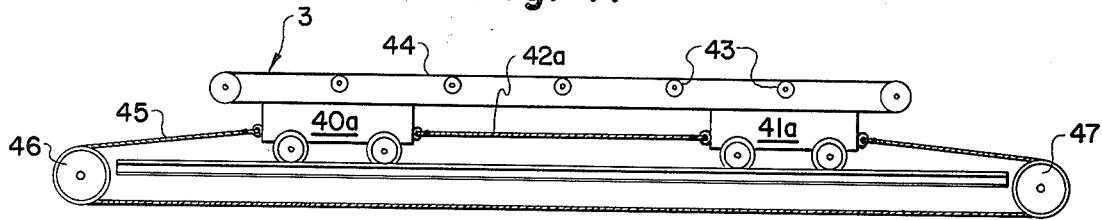
FIG. 12 is a view similar to FIG. 11 but showing the two parts of the carriage connected through a cable linkage.

In FIG. 12 the carriage similarly comprises two parts, as in FIG. 11, and they are designated 40a and 41a. In this case they are directly connected by a flexible cable 42a; the belt conveyor and supports are the same as described above, and similar reference numerals have been used. However, in this case the distal ends of the carriage sections are connected by a cable 45 passing around guide pulleys 46 and 47. One of these could be driven to propel the carriage assembly back and forth.

Figure 13:
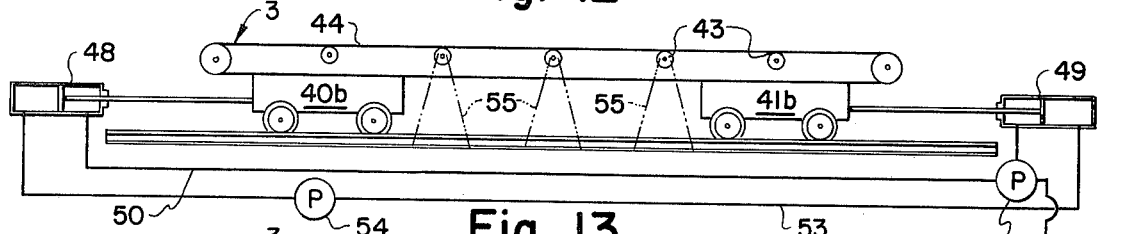
FIG. 13 is a schematic view similar to FIG. 12 wherein the two parts of the carriage are connected only through a hydraulic system.

In FIG. 13 the two carriage sections 40b and 41b are physically separate except for the conveyor belt. The distal ends of the carriages are here shown as having fluid pressure cylinder and piston units 48 and 49, respectively, thereon. A hydraulic line 50 connects the ends of these cylinders at the sides of the piston nearest the confronting carriage ends. A constant pressure fluid pressure pump 51, with reservoir 52, keeps a pressure in this line sufficient at all times to maintain the carriages a fixed distance apart. A second fluid pressure line 53 with a reversible pump 54 intermediate its ends, has its ends connected to the two cylinders at the ends of said cylinders remote from the respective carriage. This pump and fluid pressure line may operate to propel the two carriages back and forth as a unit, and at variable overall speeds as required. The transfer conveyor belt itself is supported at intervals on stationary supports 55 on the shop floor or overhead hangers at intervals between the limits of travel of the two carriages. This arrangement is desirable where the shuttle conveyor may be well off the ground. The shuttle conveyor then occupies much less floor space.

Figure 14:
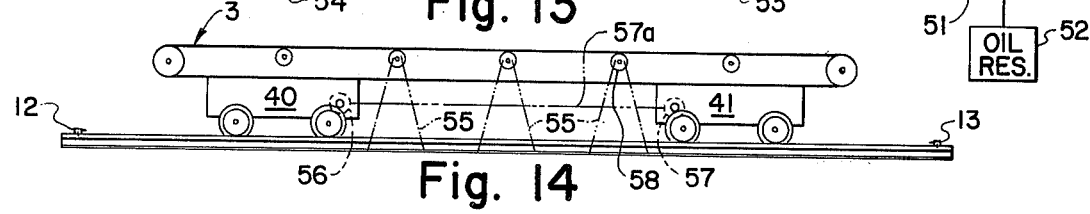
FIG. 14 is a view similar to FIG. 13 but indicating an electrical link between the two parts of the carriage.

In FIG. 14 each carriage 40 and 41 has a reversible motor 56 and 57 respectively interconnected by a conventional circuit indicated by broken line 57a, and which may include limit switches 12 and 13 and speed controls in such manner that motor 55 drives the carriage unit 40 in the advance direction and motor 56 drives the unit 41 in the retreat direction at such relative speeds as may be selected while the idle motor imposes sufficient drag to keep the loaded belt from sagging, assisted of course by the fixed intermediate supports 58 on the shop floor or overhead hangers as above mentioned similar to supports 55 in FIG. 13. This arrangement also leaves more room on a shop floor if the shuttle conveyor is well above the floor level.

Figure 15:
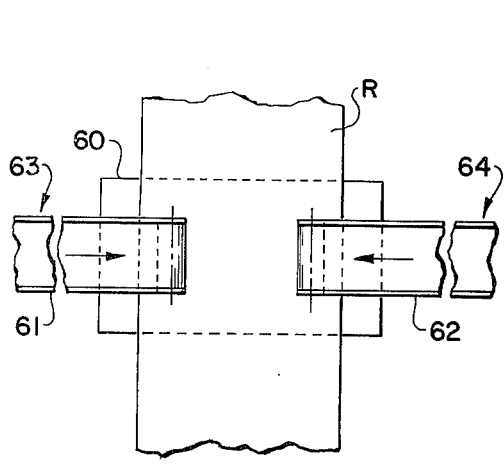
FIG. 15 is a schematic plan view of an arrangement wherein there are two shuttle conveyors opposed to each other on a single carriage.

In FIG. 15, there is schematically diagrammed fragments of an arrangement where there are opposed — but not necessarily aligned — shuttle conveyyors on a single carriage unit. The carriage unit moves back and forth under the receiving conveyor R while the opposed conveyor belts are arranged so that their respective discharge ends move across the receiving conveyor. In this view 60 indicates the carriage structure which is of any required length even with connected spaced carriage units as previously described. There are two opposed shuttle belts 61 and 62 mounted on this carriage, each with one or more loading points 63 and 64 respectively. They may have a single drive or separate drives. With this arrangement the carriage must generally move in both directions at the same speeds so that both belts would then be driven as in FIG. 9 previously described, and one might deposit a layer over that first put down by the other, and may lay down a pattern on the belt R similar to that diagrammed in FIG. 20, since in this case belt 64 would start laying down a new diagonal row in the reverse direction at the point where belt 63 stopped, and vice versa.

Figure 17:
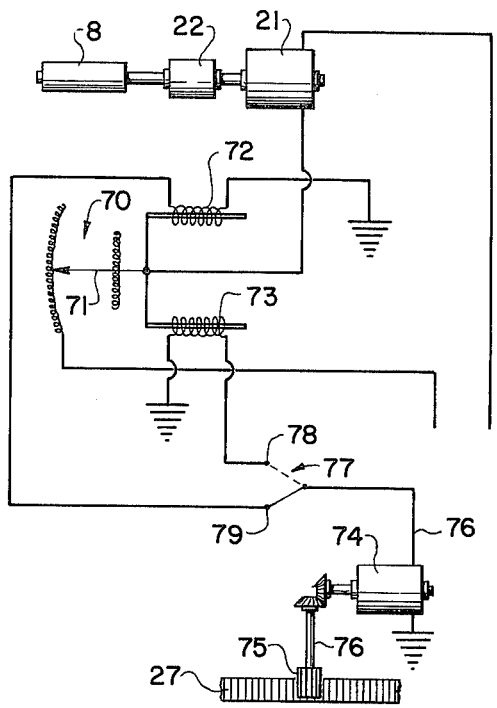
FIG. 17 is a schematic view wherein the mechanical differential drive for the shuttle conveyor belt is replaced with an electrical system.

In FIGS. 1 and 16 I have diagrammatically indicated one way in which a mechanical differential may be used for controlling the speed of the shuttle conveyor belt relative to the carriage, but constant with respect to the ground. In FIG. 17 I have indicated one of several ways in which this result may be accomplished electrically.

In FIG. 17 as in FIGS. 7 and 16, 21 is the motor for driving the shuttle belt drive pulley 8 through speed reducer 22. It is a variable speed motor controlled by a rheostat 70. The rheostat 70 has a movable contactor 71 that is spring-biased to return to a central position, but it may be moved in a speed-reducing direction by solenoid 72 and a speed increasing position by a solenoid 73.

There is a generator 74 that is driven through gearing from a pinion 75 and shaft 76 when the carriage is moving by engagement of the pinion 75 engaged with the rack 27 as in FIG. 1. One side of the generator output leads through wire 76 to a double pole switch 77 that is shifted electrically by limit switches as in FIG. 2 or mechanically by means (not shown) to close a circuit with either contact 78 or 79, depending on the direction of movement of the carriage. If the carriage is advancing switch 77 is closed on contact 79 to energize solenoid 72 to reduce the motor speed 21 proportionately to the speed of forward movement of the carriage, and if the carriage is retreating, switch 77 is closed with contact 78 to increase the carriage speed. The other output side of the generator 71 is indicated as a return or ground 74.

As indicated above, this is merely one arrangement in which electrical means is provided in place of a mechanical one for differentially controlling the shuttle belt speed.

Figure 18:
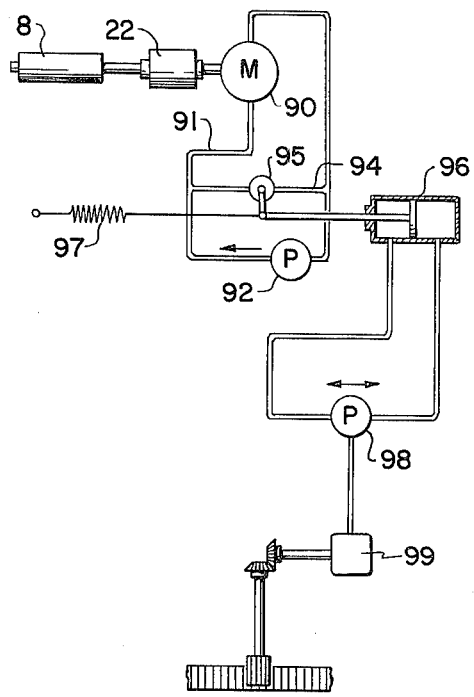
FIG. 18 is a schematic view similar to FIG. 17 wherein the differential is provided by a hydraulic system.

FIG. 18 is a schematic diagram showing another modification indicating that hydraulic means may be used in place of mechanical or electrical means for differentially controlling the speed of the shuttle belt driving pulley and hence the speed of the belt.

Here, again, the belt drive pulley is designated 8, 22 is a speed reducer, but in place of an electric driving motor there is indicated a hydraulic motor 90 supplied with fluid under pressure through line 91 from a constant speed motor-driven pump 92. There is a return connection 93 between the hydraulic motor and pump. Pipe 94 is a bypass across the inlet and outlet of the motor 91 with a control valve 95 to bypass more or less pressure to vary the speed of the motor 90. This valve is operated by a fluid pressure cylinder and piston unit 96 which may be opposed by a spring 97. The cylinder and piston is moved in one direction or the other by a reversible fluid pressure pump 98 driven by the movement of the carriage, as by a rack and pinion arrangement previously described through appropriate gearing in box 99. As the carriage moves to the forward direction, cylinder and piston unit 96 will open valve 95 to reduce the speed of the motor against the tension of spring 96 but when the carriage reverses the piston will move in the opposite direction to increasingly close the valve and thereby increase the speed of the motor 90.

In any event, with the use of a differential of some kind as here disclosed, the complicated belt reeving system and heavy carriage required by other systems, as disclosed for example in the Greaves patent is avoided. With the present invention, it is only necessary to move the carriage back and forth while a single motor for driving the conveyor in conjunction with a differential, or speed control for the motor acting as a differential, takes care of the belt speed, increases or decreases belt speed relative to the carriage while keeping it constant relative to the receiving conveyor R and the loading point 2, that is relative to the ground.

I claim:

1. A shuttle conveyor arranged to receive material from a fixed point of supply and discharge the same from one end onto a receiving means across which said end travels comprising:
   a. a carriage;
   b. a single endless belt conveyor unit fixed on the carriage with upper and lower runs of fixed length and with a roller at each end around which the belt passes, the belt being arranged to receive material directly from said fixed point of supply, one end of the unit being the material discharge end and it projects beyond one end of the carriage a distance equal to that width of the receiving means across which it travels;
   c. means for reciprocating the carriage; and
   d. means responsive to the speed and direction of travel of the carriage for driving the conveyor belt at a variable speed relative to the carriage in such manner that its speed relative to the point of supply and the ground is constant.

2. A shuttle conveyor arranged to receive material directly from a fixed supply point and discharge the material from one end onto a receiving means across which it travels comprising:
   a. a carriage;
   b. a single endless belt conveyor unit with upper and lower runs of effective fixed length during operation, said conveyor belt unit being fixed on the carriage with one end constituting a material discharge end projecting over the receiving means, the upper run of the belt conveyor being arranged to receive material directly from the fixed supply point;
   c. means for reciprocating the carriage toward and away from the receiving means but with the discharge end of the belt conveyor being always positioned to move back and forth over the receiving means with the back and forth travel of the carriage;
   d. conveyor drive means adjusted to drive the conveyor at a predetermined speed when the carriage is stationary; and
   e. variable drive on the conveyor unit for operating the belt and other means responsive to the movement of the carriage to decrease the speed of the conveyor relative to the carriage when the carriage is advancing toward the receiving means and increasing said speed when the carriage is moving away from the receiving means.

3. A shuttle conveyor as defined in claim 2 wherein said last-named means is arranged to maintain the speed of the conveyor relative to the fixed supply point at the predetermined speed at which it is adjusted to operate when the carriage is stationary.

4. A shuttle conveyor as defined in claim 2 wherein the last-named means is arranged to vary the speed of said conveyor relative to the carriage in such manner that the speed of travel of the conveyor relative to the fixed point of supply of the material is substantially constant.

5. A system for transferring pellets or other material discharging in a subdtantially continuous stream from a fixed point and loading them onto a continuously moving receiving conveyor in successive diagonal swaths across the receiving conveyor comprising:
   a. a reciprocable carriage at one side of the receiving conveyor movable in a direction transverse to the length of the receiving conveyor through a cycle between a far side of said conveyor remote from the carriage to a near side and return,
   b. a shuttle conveyor belt mounted entirely on the carriage comprising an endless belt extending in the direction parallel with the direction of travel of the carriage with upper and lower runs of constant fixed length and having a discharge end which is carried back and forth across the receiving conveyor by the reciprocable carriage, said shuttle conveyor also extending at all times in a position under said fixed point of supply where it receives material from said fixed source of supply:
   c. means for driving said shuttle conveyor belt at predetermined speed relative to the ground when the carriage is stationary with means responsive to conveyor movement to change the speed of the shuttle conveyor relative to the carriage in such manner that with the carriage moving toward or away from the receiving conveyor the speed of the shuttle belt relatively to the ground will be the same as when the carriage is stationary, and
   d. means for reciprocating the carriage through a complete cycle in a time interval approximately equal to the time required by the receiving conveyor to move a distance equal to the width of a swath of material deposited by the shuttle conveyor on the receiving conveyor in moving from adjacent the far edge of the receiving conveyor to its limit of travel toward the near side with the return travel of the shuttle conveyor and carriage being sufficiently fast that substantially no material is intended to be discharged on the receiving conveyor in the portion of the return travel from the near to the far edge.

6. A shuttle conveyor arranged to receive material directly from a fixed supply point and discharge the material from one end onto a receiving means across which it travels comprising:
   a. a carriage;
   b. a single endless conveyor belt unit having a roller at each end and an endless belt with top and bottom runs of fixed length entirely mounted on the carriage with the top thereof extending beneath the said fixed supply point and a pulley at one end extending at all times over the receiving means;

c. means for reciprocating the carriage toward and away from the receiving means;

d. conveyor means adjusted to drive the conveyor at a predetermined speed when the carriage is stationary; and e. variable speed drive means on the conveyor unit for operating the belt and other means responsive to the movement of the carriage to decrease the speed of the conveyor relative to the carriage when the carriage is advancing toward the receiving means and increasing said speed when the carriage is moving away from the receiving means, wherein said other means is a differential speed varying means comprising an element on the carriage cooperating with fixed means on the ground with respect to which the carriage moves.

7. A shuttle conveyor as defined in claim 6 wherein the variable speed drive comprises a motor and a differential gear through which the motor tramsmits motion to the conveyor belt and means on the carriage operated by movement of the carriage relative to the ground and operatively connected with the differential gear for varying the motion transmitted from the motor through the differential gear to add to or detract from motion transmitted to the conveyor from the motor to increase the speed of the conveyor relative to the carriage when the carriage is moving in a direction away from the receiving means and decrease it when the carriage is moving in a direction toward the receiving means.

8. A shuttle conveyor as defined in claim 7 in which said differential and motor and the means on the carriage operated by movement of the carriage relative to the ground are arranged to keep the travel of the conveyor relative to the ground substantially constant at all times whether the carriage is moving or stationary.

9. A shuttle conveyor as defined in claim 6 in which the conveyor drive means comprises a variable speed motor with control means for effecting variation of the motor speed and there is means on the carriage operated by movement of the carriage relative to the ground for operating said control means to inversely vary the motor speed when the carriage is moving in one direction and directly when the carriage is moving in the opposite direction in such manner that the speed of the conveyor in transporting material is substantially constant relative to the ground.

10. A system wherein material is carried from a source at a substantially constant rate to a point of discharge at which point it is delivered onto a shuttle conveyor which has a discharge end, which shuttle conveyor is reciprocated transversely to said point of discharge and from which shuttle conveyor material is in turn discharged onto a receiving area across which the discharge end of the conveyor moves, said shuttle conveyor comprising a carriage and means for effecting reciprocation thereof relative to the ground and a single belt conveyor having upper and lower runs both of normally fixed length entirely mounted on and fixed against movement relative to the carriage along with a driving means for operating the conveyor at a predetermined speed relative to the ground when the carriage is stationary, the upper run of the belt conveyor being arranged to receive material directly to said point of discharge, and means on the carriage responsive to its movement back and forth relative to the ground for varying the speed of travel of the belt conveyor to decrease its speed relative to the carriage when the carriage is moving in one direftion and increasing its speed when the carriage is moving in the reverse direction.

11. A system as defined in claim 10 wherein said means on the carriage for driving the belt conveyor at a predetermined speed when the carriage is stationary transmits its motion to the belt conveyor through a differential gear and said means on the carriage for varying the speed of the belt relative to the carriage is operably connected with said differential gear.

12. A system as defined in claim 10 in which said last-named means differentially varies the speed of travel of the belt of said conveyor relative to the carriage while maintaining its rate of travel constant relative to the point at which material is discharged onto it from said source.

13. A system as defined in claim 12 wherein said means on the carriage for driving the belt conveyor at a predetermined speed when the carriage is stationary comprises a variable speed motor and a variable speed controller for said motor and the said means on the carriage for varying the speed of the belt conveyor to decrease its speed relative to the carriage when the carriage is moving in one direction and increase it when the carriage is moving in the other direction but maintaining its speed of travel relative to the point at which material from the source is received on it is arranged to operate said variable speed controller.

14. A system as defined in claim 13 wherein the motor is an electric motor and the variable speed controller is one with "slow" and "fast" positions and with a controller means set at an intermediate position between fast and slow and the means on the carriage for varying the speed of the belt conveyor relative to the carriage is arranged to move said variable speed controller means from said intermediate position toward the slow or fast position depending on the speed and direction of travel of the carriage.

15. A system as defined in claim 12 in which a hydraulic system is operated by said means on the carriage responsive to the back and forth movement of the carriage to vary the speed of travel of the conveyor belt relative to the carriage.

\* \* \* \* \*